United States Patent
Rangarajan et al.

(10) Patent No.: US 8,239,465 B2
(45) Date of Patent: Aug. 7, 2012

(54) GENERATING HUMAN INTERACTIVE PROOFS

(75) Inventors: Aparna Rangarajan, Renton, WA (US); Ravi Kiran Poluri, Sammamish, WA (US); Usman Ahmed Shami, Bellevue, WA (US); Weisheng Li, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 12/388,522

(22) Filed: Feb. 19, 2009

(65) Prior Publication Data

US 2010/0212018 A1   Aug. 19, 2010

(51) Int. Cl.
G06F 15/16 (2006.01)
G06F 15/173 (2006.01)
G06F 15/177 (2006.01)

(52) U.S. Cl. .................................................... 709/206

(58) Field of Classification Search .................. 709/206
See application file for complete search history.

(56) References Cited

U.S. PATENT DOCUMENTS

| | | | |
|---|---|---|---|
| 6,209,103 B1 * | 3/2001 | Schreiber et al. | 726/26 |
| 7,606,915 B1 * | 10/2009 | Calinov et al. | 709/229 |
| 7,680,891 B1 * | 3/2010 | Pongsajapan | 709/206 |
| 2002/0032869 A1 * | 3/2002 | Lamberton et al. | 713/200 |
| 2005/0066201 A1 * | 3/2005 | Goodman et al. | 713/202 |
| 2006/0294575 A1 * | 12/2006 | Rogers | 726/1 |
| 2007/0201745 A1 | 8/2007 | Wang et al. | |
| 2007/0250920 A1 | 10/2007 | Lindsay | |
| 2008/0050018 A1 | 2/2008 | Koziol | |
| 2008/0244700 A1 | 10/2008 | Osborn et al. | |
| 2009/0077629 A1 * | 3/2009 | Douceur et al. | 726/2 |
| 2009/0150983 A1 * | 6/2009 | Saxena et al. | 726/7 |
| 2010/0077209 A1 * | 3/2010 | Broder et al. | 713/168 |
| 2010/0082998 A1 * | 4/2010 | Kohavi | 713/182 |
| 2010/0180333 A1 * | 7/2010 | Bono et al. | 726/13 |

OTHER PUBLICATIONS

Vanasco Jonathan, "Authen:: PluggableCaptcha", Retrieved at<<http://search.cpan.org/~jvanasco/Authen-PluggableCaptcha-0.05/lib/Authen/PluggableCaptcha.pm>>, pp. 1-5.
"VeriWord", Retrieved at<<http://webscripts.softpedia.com/script/PHP-Clases/VeriWord-13078.html>>, pp. 1-3.
Toub Stephen,"An ASP.NET Framework for Human Interactive Proofs", Retrieved at<<http://msdn.microsoft.com/en-us/library/ms972952.aspx>>, Sep. 2004, pp. 1-17.
Rahman Mohammad Jahedur "Captcha Plug-in in Codelgniter", Retrieved at<<http://lamp.codeproject.com/KB/web-security/captcha.aspx>>, Jul. 29, 2008, p. 1-3.

* cited by examiner

*Primary Examiner* — Haresh N Patel
*Assistant Examiner* — Chau Le
(74) *Attorney, Agent, or Firm* — Microsoft Corporation (57) ABSTRACT

A method for generating one or more human interactive proofs (HIPs) is described herein. A HIP request may be received. One of a plurality of HIP engines may be selected using a randomization algorithm. Each HIP engine may have a distinct algorithm for generating the one or more HIPs. The one or more HIPs may be generated using the one of the plurality of HIP engines.

20 Claims, 5 Drawing Sheets

| | | 410 | 420-1 | 420-2 |
|---|---|---|---|---|
| 411 | | CONFIG. ID | 00001 | 00002 |
| 412-A | | PERIOD OF EXECUTION | 2 DAYS | 7 DAYS |
| 413-A | | HIP ENGINE 1 | 6-CHAR HIP A | IMAGE HIP A |
| 414-A | | TRAFFIC %AGE | 70 | 20 |
| 415-A | | STATIC PARAMETER | FONT | SHADING |
| 416-A | | STATIC VALUE | ARIAL | HEAVY |
| 417-A | | DYNAMIC PARAMETER | DISTORTION | DISTORTION |
| | | DYNAMIC VALUES | 0.0 – 2.0 | 1 - 10 |
| 412-B | | HIP ENGINE 2 | 6-CHAR HIP B | 6-CHAR HIP B |
| 413-B | | TRAFFIC %AGE | 30 | 80 |
| 414-B | | STATIC PARAMETER | DISTORTION | DISTORTION |
| 415-B | | STATIC VALUE | 1.8 | HEAVY |
| 416-B | | DYNAMIC PARAMETER | FONT | FONT |
| 417-B | | DYNAMIC VALUES | ARIAL, COURIER, TAHOMA | CAMBRIA, TIMES NEW ROMAN |

GENERATING HUMAN INTERACTIVE PROOFS

BACKGROUND

The Web can be a dangerous place. Attackers come at your sites constantly from all sides, wielding powerful weapons in attempts to degrade, defile, compromise, shut down, or simply take advantage of your Web presence. A user may fight back with security patches, input validation checks, encryption, running with least privilege, reducing possible attack surface, and a myriad of other secure coding techniques. But new attacks and new angles continue to proliferate, so the defenses evolve as well.

One of the greatest tools in an attacker's arsenal is computing power. The speed at which a computer can send hundreds and thousands of requests to hundreds and thousands of sites is staggering. Often, this is used for attacks that in moderation might not be considered an attack at all. For example, Hotmail® provides free e-mail accounts to the general public. However, Hotmail® is not happy to provide thousands of accounts to an attacker looking to use the accounts to send boatloads of spam to unsuspecting users. The problem for Hotmail® and other sites in the same predicament is that it can be very hard to differentiate a browser controlled by a grandmother looking to open an account to correspond with her grandson, from an attacker with a custom application looking to automatically open multiple accounts to send that grandson e-mail of a different sort. A famous problem known as the Turing Test led to one solution.

In 1950, Alan Turing fundamentally changed the world of artificial intelligence by proposing what is now known as the Turing Test. Turing believed that manmade computers would one day have abilities and intelligence rivaling that of humans. After all, the human brain is a form of a computer, albeit one based in biology rather than in silicon. Turing believed that asking whether computers can think is meaningless, that the true test of intelligence is whether a human could differentiate an artificial intelligence developed by human from an actual human.

To further his argument, Turing proposed the Turing Test. The Turing Test involves a scenario where a computer is placed in one room and a human contestant in another, both of which are separated from a third party. The third party is a human interrogator, who does not know which room contains the computer. This interrogator poses questions to both rooms through a text-based interface and receives answers from both the computer and the human contestant. When satisfied, the interrogator guesses which room contains the computer and which room contains the human contestant. If the interrogator is unable to come to the correct answer more than half the time, the computer passes the test and is considered as intelligent as the human contestant.

The Turing Test is based on the problem of a human differentiating between a computer and a human. In a sense, the Turing Test addresses the reverse of the problem described above: differentiating human-initiated requests from requests scripted by a program. This scenario has formally been named the Reverse Turing Test (RTT), although the term has also been used in some circumstances to describe a similar scenario but where both contestants attempt to be recognized as a computer.

One solution to the Reverse Turing Test is the CAPTCHA. CAPTCHAs, or more specifically "Completely Automated Public Turing Tests to Tell Computers and Humans Apart," also known as Human Interactive Proofs (HIPs). A HIP is a puzzle that is easily solvable by a human but difficult for a computer. In essence, HIPs take advantage of the intelligence gap that exists between humans and computers. HIPs differ from the standard Turing Test in that they are "completely automated," meaning that the questions or puzzles posed to the user come from a computer, and are generated automatically. CAPTCHA-based systems are now in use all over the Web, from large Internet portals to smaller, individually run personal sites.

There are various types of HIP puzzles, typically presented to users as images. One popular type of HIP renders words in a distorted form, asking the user to enter the presented word. Another type of HIP displays one or more pictures of a familiar entity (such as a monkey), also distorted, asking the user to name the contents of the pictures.

When implemented properly, a HIP puzzle can prevent an automated script or a hacker from accessing services and resources that are meant for only humans to use, such as web site account registration, e-mail, and chat rooms. However, as these resources become more valuable, the ability to solve HIPs has become more valuable.

A HIP that displays distorted characters, can typically be solved via a two step process by computers. In the first step, the HIP image is segmented into its component characters. In the second step, the segmented characters may be analyzed using an optical character recognition (OCR) program to recognize the characters. The challenge for spammers is to collect a significant number of HIP samples and have the samples labeled by humans. Once the labeling is complete, it is possible for a software engineer to write a program that can learn how to segment the HIPs by using the labeled set as a training set.

SUMMARY

Described herein are implementations of various technologies for generating human interactive proofs (HIPs). A resource provider, such as a web email account provider, may implement HIP technology to protect email account resources. More specifically, the resource provider may impede automated registration of large numbers of accounts that is typically performed by spammers using software tools. While the spammer may use HIP-solving technology to obtain access to the resources, the resource provider may use a HIP framework that impedes the successfulness of HIP-solving technology. With the HIP framework, HIPs may be generated dynamically, making it more difficult for HIP-solving technology to predict what the HIP to be solved may look like. By complicating the ability of HIP-solving technology to predict HIPs generated by the framework, the ability of the HIP-solving technology to solve HIPs may be reduced.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

FIG. 4 illustrates a data structure for configuration change management in accordance with various implementations of the technologies described herein.

DETAILED DESCRIPTION

In general, one or more implementations of various technologies described herein are directed performing symbolic computations on a mathematical equation. The various implementations will be described in more detail in the paragraphs below with reference to FIGS. 1-5.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
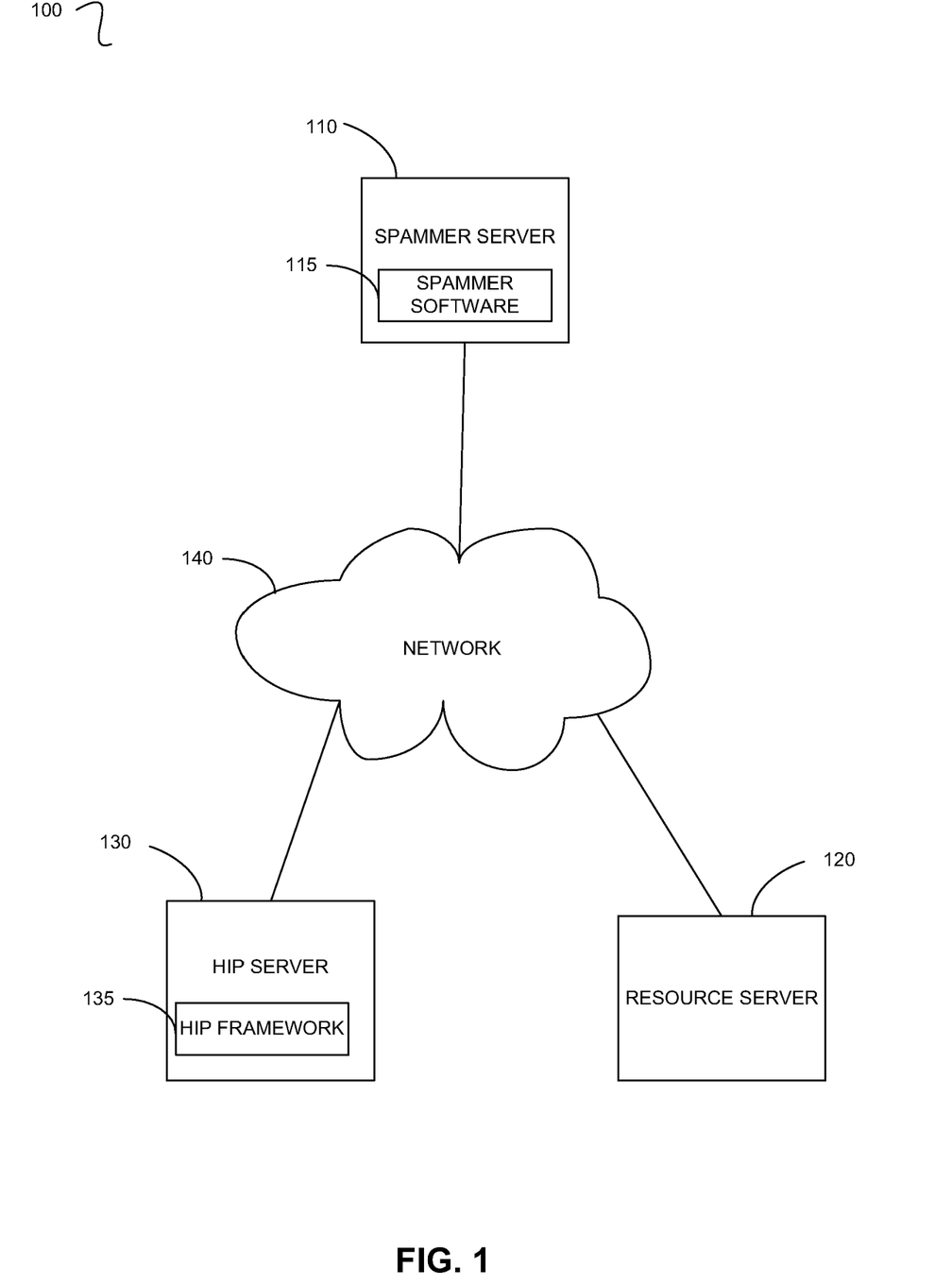
FIG. 1 illustrates a system for generating a human interactive proof (HIP) in accordance with various implementations of the technologies described herein.

FIG. 1 illustrates a system 100 for generating a human interactive proof (HIP) in accordance with various implementations of the technologies described herein. The system 100 may include a resource server 120, a spammer server 110, and a HIP server 130, in communication over a network 140. The network 140 may be any connection or set of connections such as enterprise-wide computer networks, intranets, and the Internet.

The resource server 120 may be a computing device that is used to provide a service to human users. Examples of such services include email, Internet chat rooms, Web site account registrations, and the like.

The spammer server 110 may be used by a spammer to obtain resources from the resource server 120. In one implementation, the spammer server 110 may include spammer software 115 that obtains resources automatically. By obtaining the resources automatically, the spammer may collect great multitudes of resources from the resource server 120.

For example, the spammer software 115 may collect a multitude of email addresses from the resource server 120. The spammer may then use the multitude of email addresses to send spam emails across the Internet.

The resource server 120 may be in communication with the HIP server 130. The HIP server 130 may be configured to impede the automated collection of the resources.

For example, in response to a request for resources from the spammer server 110, the resource server 120 may request a HIP from the HIP server 130. As stated previously, HIPs may be puzzles that are easily solved by humans, but not easily solved by computers. By sending the HIP to the spammer server 110, the HIP server 130 may impede the ability of the spammer to obtain resources from the resource server 120.

However, the spammer software 115 may be further configured to solve the HIPs. As stated previously, the spammer may collect a representative sample of HIPs from the HIP server 130. A human being may then label the samples, and have a software engineer modify the spammer software 115 such that it may solve the HIPs.

Accordingly, the HIP server 130 may include a HIP framework 135. The HIP framework 135 may be configured to generate HIPs dynamically to impede the ability of the spammer software 115 to solve the HIPs.

For example, HIPs may be generated using any one of numerous algorithms, also referred to herein as HIP engines. Each HIP engine may generate HIPs with different types of challenges for the spammer software 115 to solve. The different types of challenges may include character-based HIPs, picture-based HIPs, HIPs as games, audio HIPs, and the like.

The HIP framework 135 may be configured to generate HIPs from randomly selected HIP engines. In such a case, the spammer software 115 may not be able to predict the algorithm that is used to generate a particular HIP. As such, the spammer software's attempts to solve the HIPs may fail. The HIP framework 135 is described in greater detail with reference to FIG. 3.

Figure 2:
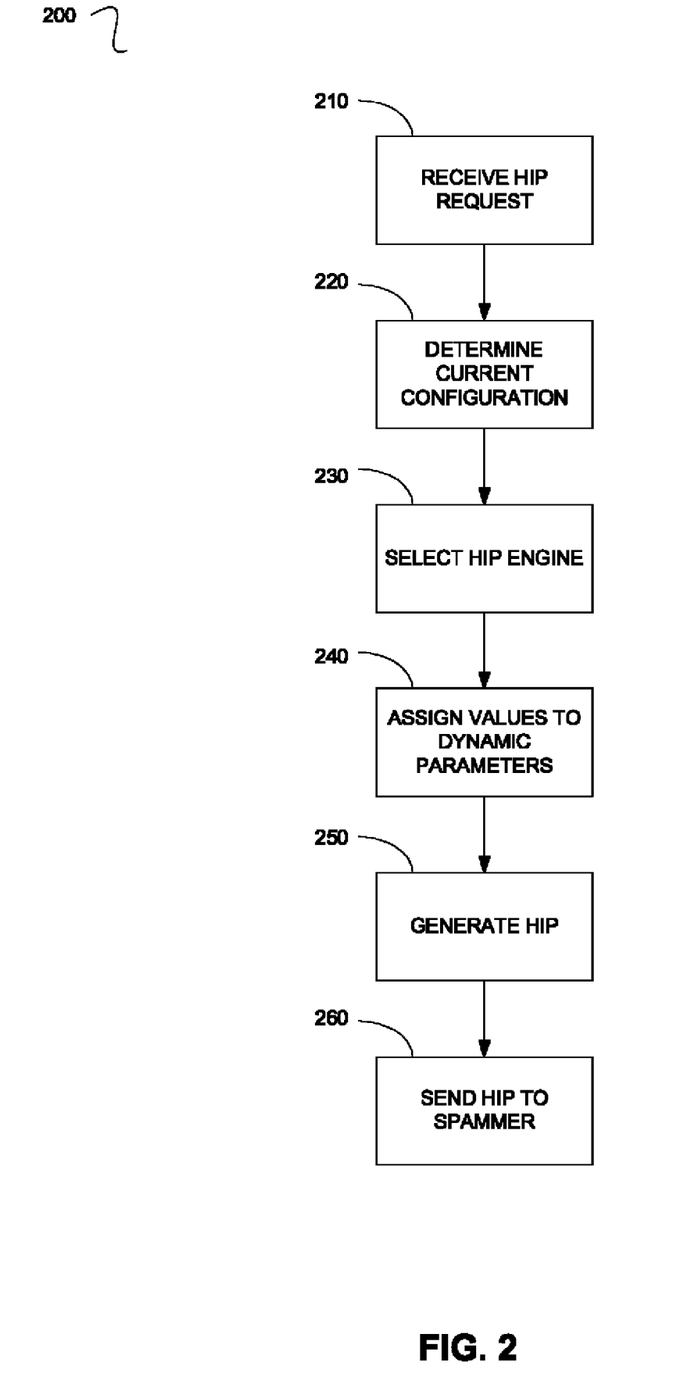
FIG. 2 illustrates a flowchart of a method for generating the HIP in accordance with various implementations of the technologies described herein.

FIG. 2 illustrates a flowchart of a method 200 for generating the HIP in accordance with various implementations of the technologies described herein. In one implementation, the HIP framework 135 may perform the method 200. It should be understood that while the flow chart indicates a particular order of execution, in some implementations, certain steps of the method 200 may be executed in a different order.

At step 210, the HIP framework 135 may receive a HIP request. As stated previously, the resource server 120 may send the HIP request to the HIP framework 135 in response to a request for resources from the spammer software 115. In one implementation, the HIP request may be received through an interface such as, SOAP, HTTP_GET, redirect, and the like. In another implementation, the HIP framework 135 may receive the HIP request from the spammer software 115.

At step 220, the current configuration may be determined. The current configuration may specify parameters for dynamically generating the HIPs. For example, the current configuration may specify two or more HIP engines to be randomly selected for generating the HIP.

In one implementation, the HIP framework 135 may be configured to periodically rotate different configurations of HIP generation. More specifically, the current configuration could change over specified periods. The specified periods could range from periods of minutes to periods of months.

For example, the configuration in one period may specify two HIP engines to be used, while the configuration for a subsequent period may specify two completely different HIP engines.

In another implementation, the current configuration may specify a traffic routing percentage for each of the HIP engines. The traffic routing percentage may specify that a particular HIP engine be used a specified percentage of the time. For example, the current configuration may specify a HIP engine A, and a HIP engine B. Additionally, the current configuration may specify that HIP engine A be selected 30% of the time, while HIP engine B is selected 70% of the time.

In yet another implementation, the current configuration may specify parameters for each of the HIP engines. The parameters may vary in number and type for each HIP engine. For example, a character-based HIP engine may use 10 parameters that are used to determine how the characters are distorted. For example, one parameter could specify a rotation angle. Meanwhile, a picture-based HIP engine may use 20 parameters to determine how a picture is distorted. For example, one parameter could specify a slope at which the picture is presented.

At step 230, the HIP engine may be selected based on the current configuration. As stated previously, the HIP engine may be selected randomly from the HIP engines specified in the current configuration. In the implementation where a traffic routing percentage is specified, the percentage may be incorporated into a randomization algorithm for selecting the HIP engine.

At step 240, values may be assigned to dynamic parameters. Each of the HIP engines 330 may include both static and dynamic parameters. The static parameters may include values that remain constant from one execution of the HIP engine 330 to the next.

The dynamic parameters, on the other hand may change values. In one implementation, the current configuration may specify dynamic parameters with a range of possible values. Accordingly, the HIP framework 135 may randomly assign one of the values within the specified range to each of the dynamic parameters. Advantageously, randomizing parameter values of the selected HIP engine may further complicate the challenge for the spammer software 115 to solve the HIP.

At step 250, the HIP may be generated. The HIP framework 135 may call the selected HIP engine with the parameters that are specified in the current configuration, including the dynamically assigned parameters. The HIP engine may then generate the HIP.

In one implementation, the HIP engine may be called through a component object model (COM) interface. At step 260, the HIP framework 135 may send the generated HIP to the spammer software 115.

Figure 3:
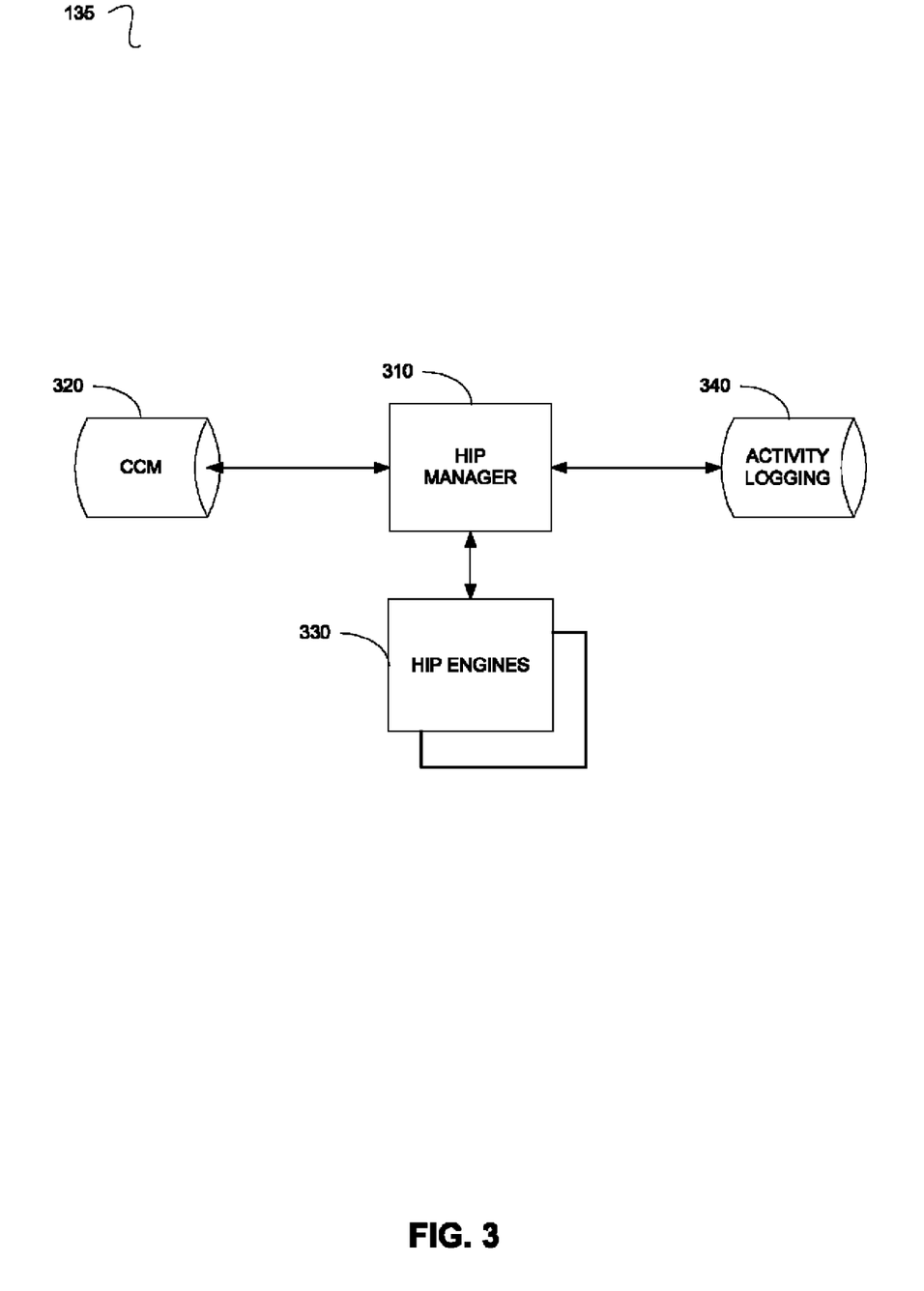
FIG. 3 illustrates components of the HIP framework in accordance with various implementations of the technologies described herein.

FIG. 3 illustrates components of the HIP framework 135 in accordance with various implementations of the technologies described herein. The HIP framework 135 may include a HIP manager 310, configuration change management (CCM) 320, HIP engines 330, and activity logging 340.

The HIP manager 310 may perform management functionality of the HIP framework 135. For example, the HIP manager 310 may receive the HIP request, determine the current configuration, initiate a call to the selected HIP engine, and send the generated HIP to the spammer software 115.

In one implementation, the HIP manager 310 may also perform server-side functionality of the HIPs. Server-side functionality may include validating solutions to the HIP, or other functionality as implemented by the selected HIP engine.

The CCM 320 may be a data store that contains the configurations for generating the HIPs. In one implementation, the HIP manager 310 may select the current configuration from the CCM 320. In another implementation, the HIP manger 310 may provide a user interface (not shown) through which the resource provider may create customized configurations. The CCM 320 is described in greater detail with reference to FIG. 4.

As stated previously, the HIP engines 330 may be software that generates the HIP based on an algorithm and specified parameters. In one implementation, the HIP manager 310 may execute the selected HIP engine 330 through a COM interface.

The HIP manager 310 may also track activity on the HIP framework 135 in the activity logging 340. The activity logging 340 may be a data store that tracks the success of particular configurations in preventing the spammer software 115 from solving the generated HIPs.

In one implementation, the HIP manager 310 may update the CCM 320 to exclude configurations whose success rates fall below a certain threshold. The tracking may include several layers of granularity, including traffic routing percentages, HIP engines 330, and parameter values (static and dynamic) that are used for particular HIP engines 330.

FIG. 4 illustrates a data structure for the CCM 320 in accordance with various implementations of the technologies described herein. As stated previously, the CCM 320 may be a data store for the configurations that may be used to generate the HIPs.

The CCM 320 may include variables 410. The variable, "CONFIG. ID" may be used for the tracking log 340 to track the success rate of a particular configuration.

Each column of the values 420 may represent one configuration to be used for the period specified in variable 411, labeled, "PERIOD OF EXECUTION." For example, configuration 420-1 may be used by the HIP manager 310 for a period of 2 days. After 2 days has lapsed, configuration 420-2 may become the current configuration for the next period of 7 days.

Variables 412-A, 412-B represent "HIP ENGINE 1," and "HIP ENGINE 2," respectively. These variables represent a set of HIP engines that are randomly selected from when generating the HIP. It should be understood that more than 2 HIP engines may be specified in the CCM 320. Further the HIP engines specified in the CCM 320 may be identified with labels, or any other information sufficient to identify the HIP engine 330 to the HIP manager 310.

Variables 413-A, 413-B, labeled "TRAFFIC %AGE", represent the traffic routing percentage for "HIP ENGINE 1" and "HIP ENGINE 2," as described above. Variables 414-A, 414-B and 416-A and 416-B represent static and dynamic parameters, labeled "STATIC PARAMETER," and "DYNAMIC PARAMETER," for "HIP ENGINE 1" and "HIP ENGINE 2," respectively. Variables 415-A and 415-B represent values for the static parameters. Variables 417-A and 417-B, labeled "DYNAMIC VALUES," represent values for the dynamic parameters. The static parameters may be parameters whose values do not change during the period of execution for the current configuration. In contrast, the dynamic parameters may be parameters whose values do change throughout the period of execution for the current configuration.

While the CCM 320 illustrates only one static and one dynamic parameter for each HIP engine 330, it should be understood that the number of parameters, static and dynamic, may vary based on particular implementations of the HIP engines 330.

As shown, variables 417-A, 417-B may include ranges of values, sets of values, or the like. For example, in configuration 420-1, DYNAMIC PARAMETER variable 416A has a value of "DISTORTION." DYNAMIC VALUES variable 417-A specifies the value of the "DISTORTION" parameter to be in a range from "0.0-2.0." These values may represent an amount of distortion to be applied to a particular HIP.

In configuration 420-2, DYNAMIC PARAMETER variable 416-B has a value of "FONT." DYNAMIC VALUES variable 417-B specifies the values of the "FONT" parameter to be a set of values, "ARIAL, COURIER, and TAHOMA."

Additionally, sets of potential values for a particular parameter type may vary depending on implementations of the CCM 320. For example, in configuration 420-2, DYNAMIC PARAMETER variable 416-B also has a value of "FONT." However, instead of the values specified above, the DYNAMIC VALUES variable 417-B specifies the values of the FONT parameter to be a set of values, "CAMBRIA, and TIMES NEW ROMAN."

Figure 5:
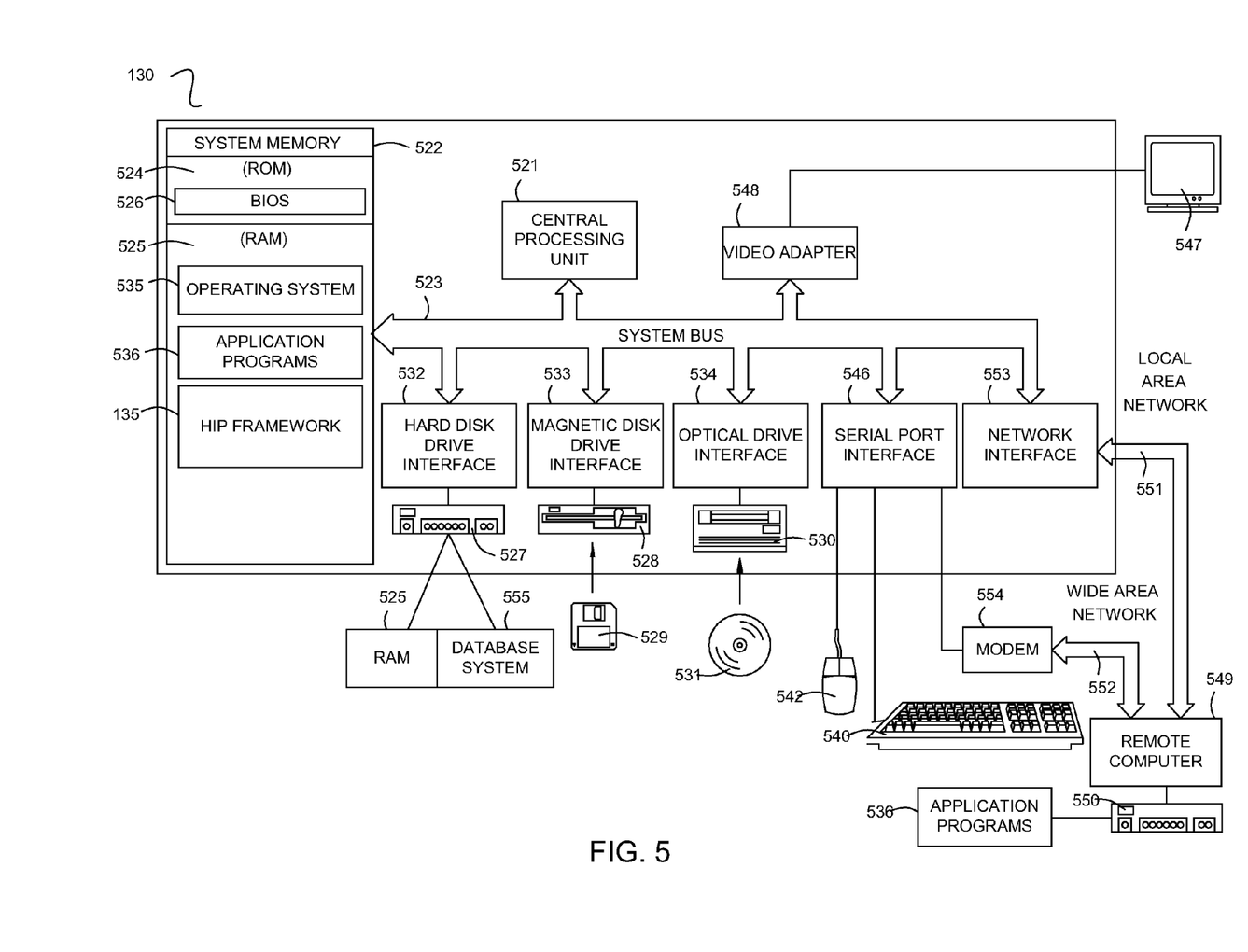
FIG. 5 illustrates a schematic diagram of the HIP server in which the various technologies described herein may be incorporated and practiced.

FIG. 5 illustrates a schematic diagram of the HIP server 130 in which the various technologies described herein may be incorporated and practiced. The HIP server 130 may include a central processing unit (CPU) 521, a system memory 522 and a system bus 523 that couples various system components including the system memory 522 to the CPU 521. Although only one CPU is illustrated in FIG. 5, it should be understood that in some implementations the HIP server 130 may include more than one CPU.

The system bus 523 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 522 may include a read only memory (ROM) 524 and a random access memory (RAM) 525. A basic input/output system (BIOS) 526, containing the basic routines that help transfer information between elements within the HIP server 130, such as during start-up, may be stored in the ROM 524.

The HIP server 130 may further include a hard disk drive 527 for reading from and writing to a hard disk, a magnetic disk drive 528 for reading from and writing to a removable magnetic disk 529, and an optical disk drive 530 for reading from and writing to a removable optical disk 531, such as a CD ROM or other optical media. The hard disk drive 527, the magnetic disk drive 528, and the optical disk drive 530 may be connected to the system bus 523 by a hard disk drive interface 532, a magnetic disk drive interface 533, and an optical drive interface 534, respectively. The drives and their associated computer-readable media may provide nonvolatile storage of computer-readable instructions, data structures, program modules and other data for the HIP server 130.

Although the HIP server 130 is described herein as having a hard disk, a removable magnetic disk 529 and a removable optical disk 531, it should be appreciated by those skilled in the art that the HIP server 130 may also include other types of computer-readable media that may be accessed by a computer. For example, such computer-readable media may include computer storage media and communication media.

Computer storage media may include volatile and nonvolatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the HIP server 130.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

A number of modules may be stored on the hard disk, magnetic disk 529, optical disk 531, ROM 524 or RAM 525, including an operating system 535, one or more application programs 536, a human interactive proof (HIP) framework 135, and a database system 555. The operating system 535 may be any suitable operating system that may control the operation of a networked personal or server computer, such as Windows® Vista, Mac OS® X, Unix-variants (e.g., Linux® and BSD®), and the like.

The HIP framework 135 may receive HIP requests from the resource server 120, and dynamically generate a HIP from one of a set of dynamically configured HIP engines. Advantageously, by dynamically generating the HIP, the ability of the spammer software 115 to solve any particular HIP may be impeded.

A user may enter commands and information into the HIP server 130 through input devices such as a keyboard 540 and pointing device 542. Other input devices may include a microphone, joystick, game pad, satellite dish, scanner, or the like. These and other input devices may be connected to the CPU 521 through a serial port interface 546 coupled to system bus 523, but may be connected by other interfaces, such as a parallel port, game port or a universal serial bus (USB). A monitor 547 or other type of display device may also be connected to system bus 523 via an interface, such as a video adapter 548. In addition to the monitor 547, the HIP server 130 may further include other peripheral output devices, such as speakers and printers.

Further, the HIP server 130 may operate in a networked environment using logical connections to one or more remote computers, such as a remote computer 549. The remote computer 549 may be another personal computer, a server, a router, a network PC, a peer device or other common network node. Although the remote computer 549 is illustrated as having only a memory storage device 550, the remote computer 549 may include many or all of the elements described above relative to the HIP server 130. The logical connections may be any connection that is commonplace in offices, enterprise-wide computer networks, intranets, and the Internet, such as local area network (LAN) 551 and a wide area network (WAN) 552.

When using a LAN networking environment, the HIP server 130 may be connected to the local network 551 through a network interface or adapter 553. When used in a WAN networking environment, the HIP server 130 may include a modem 554, wireless router or other means for establishing communication over a wide area network 552, such as the Internet. The modem 554, which may be internal or external, may be connected to the system bus 523 via the serial port interface 546. In a networked environment, program modules depicted relative to the HIP server 130, or portions thereof, may be stored in a remote memory storage device 550. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device.

One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating one or more human interactive proofs (HIPs), comprising:
   receiving a human interactive proof (HIP) request;
   selecting a configuration from a plurality of available configurations, respective available configurations specifying a plurality of available HIP engines and one or more parameters for respective available HIP engines;
   selecting a HIP engine from the plurality of available HIP engines specified by the selected configuration using a randomization algorithm, respective available HIP engines comprising a distinct algorithm for generating the one or more HIPs, the selected configuration specifying a percentage of time that the selected HIP engine is to be selected; and
   generating the one or more HIPs using the selected HIP engine.

2. The method of claim 1, the HIP request received from a spammer.

3. The method of claim 2, comprising sending the one or more generated HIPs to the spammer.

4. The method of claim 1 performed upon execution of instructions comprised in a computer readable memory.

5. The method of claim 1, the selected configuration specifying a period of time during which the selected HIP engine is to be selected.

6. The method of claim 1, the request received from a resource provider.

7. The method of claim 1 performed upon execution of instructions comprised in memory comprised in a system.

8. The method of claim 1, the selected configuration specifying a period of time during which the one or more HIPs are to be generated.

9. The method of claim 1, comprising randomly assigning one or more values to the one or more parameters.

10. The method of claim 1, comprising:
    tracking a success rate of a spammer for solving the one or more HIPs; and
    removing the selected configuration from the plurality of available configurations when the success rate exceeds a threshold.

11. The method of claim 1, the selected HIP engine comprising a character based HIP engine.

12. The method of claim 1, the selected HIP engine comprising an image based HIP engine.

13. A method for generating one or more human interactive proofs (HIPs), comprising:
    receiving a human interactive proof (HIP) request;
    selecting a configuration from a plurality of available configurations, respective available configurations specifying a plurality of available HIP engines and one or more parameters for respective available HIP engines;
    selecting a HIP engine from the plurality of available HIP engines specified by the selected configuration using a randomization algorithm, respective available HIP engines comprising a distinct algorithm for generating the one or more HIPs;
    generating the one or more HIPs using the selected HIP engine;
    tracking a success rate of a spammer for solving the one or more HIPs; and
    removing the selected configuration from the plurality of available configurations when the success rate exceeds a threshold.

14. The method of claim 13, the HIP request received from the spammer.

15. The method of claim 13, comprising sending the one or more generated HIPs to the spammer.

16. The method of claim 13, the selected configuration specifying a period of time during which the selected HIP engine is to be selected.

17. The method of claim 13, the selected configuration specifying a percentage of time that the selected HIP engine is to be selected.

18. The method of claim 13, the selected configuration specifying a period of time during which the one or more HIPs are to be generated.

19. A system for generating one or more human interactive proofs (HIPs), comprising:
    one or more processors; and
    a memory comprising instructions which when executed by at least one of the one or more processors, perform a method comprising:
      receiving a human interactive proof (HIP) request;
      selecting a configuration from a plurality of available configurations, respective available configurations specifying a plurality of available HIP engines and one or more parameters for respective available HIP engines;
      selecting a HIP engine from the plurality of available HIP engines specified by the selected configuration using a randomization algorithm, respective available HIP engines comprising a distinct algorithm for generating the one or more HIPs;
      generating the one or more HIPs using the selected HIP engine;

tracking a success rate of a spammer for solving the one or more HIPs; and removing the selected configuration from the plurality of available configurations when the success rate exceeds a threshold.

20. The system of claim 19, the selected configuration specifying at least one of:

a period of time during which the selected HIP engine is to be selected;

a percentage of time that the selected HIP engine is to be selected; or a period of time during which the one or more HIPs are to be generated.

* * * * *